United States Patent [19]

Nagashima et al.

[11] Patent Number: 4,879,740
[45] Date of Patent: Nov. 7, 1989

[54] WIDE AREA CORDLESS TELEPHONE SYSTEM HAVING MEANS FOR AVOIDING DOUBLE REGISTRATIONS

[75] Inventors: Noriaki Nagashima; Kohji Monma, both of Tokyo; Yoshitoshi Murata, Kanagawa, all of Japan

[73] Assignees: NEC Corporation; Nippon Telegraph and Telephone Corporation, both of Tokyo, Japan

[21] Appl. No.: 177,273

[22] Filed: Apr. 4, 1988

[30] Foreign Application Priority Data

Apr. 3, 1987 [JP] Japan .................................. 62-83586

[51] Int. Cl.$^4$ ............................................ H04Q 7/04
[52] U.S. Cl. ........................................ 379/61; 379/60; 455/33
[58] Field of Search ....................... 379/56, 58, 59, 60, 379/61, 62, 63; 455/33

[56] References Cited

U.S. PATENT DOCUMENTS

| | | | |
|---|---|---|---|
| 4,456,793 | 6/1984 | Baker et al. | 379/60 |
| 4,538,029 | 8/1985 | Gazzoli et al. | 379/61 |
| 4,646,345 | 2/1987 | Zdunek et al. | 379/62 |
| 4,658,416 | 4/1987 | Tanaka | 379/57 |
| 4,672,658 | 6/1987 | Kavehrad et al. | 379/63 |
| 4,731,812 | 3/1988 | Åkerberg | 379/61 |
| 4,748,655 | 5/1988 | Thrower et al. | 379/60 |
| 4,771,448 | 9/1988 | Koohgoli et al. | 379/60 |

Primary Examiner—Robert Lev
Attorney, Agent, or Firm—Sughrue, Mion, Zinn, Macpeak & Seas

[57] ABSTRACT

A wide area cordless telephone system covers a service area which is divided into a plurality of local areas to each of which belong a plurality of home position cordless telephones having multi-channel access capability. A plurality of access units are provided in each local area to define a plurality of access zones. A pre-dialing switching stage is provided for each local area to establish a connection between the access units and line terminals of a telephone switching system. Signals sent from any cordless telephone are received by a nearby access unit and applied to the pre-dialing switching stage. Each telephone transmits a registration request upon a manual command and, on receiving a response identifying a local area, returns an acknowlegement to identify the same local area as identified by the received response. On receiving a registration request, the pre-dialing switching stage transmits a response identifying the own local area through an access unit and assigns a reserved line terminal of the telephone switching system to a non-home position telephone if it is identified by the received request. On receiving an acknowledgement, the switching stage makes a registration of a telephone if the acknowledgement from it identifies the same local area as identified by the response.

4 Claims, 4 Drawing Sheets

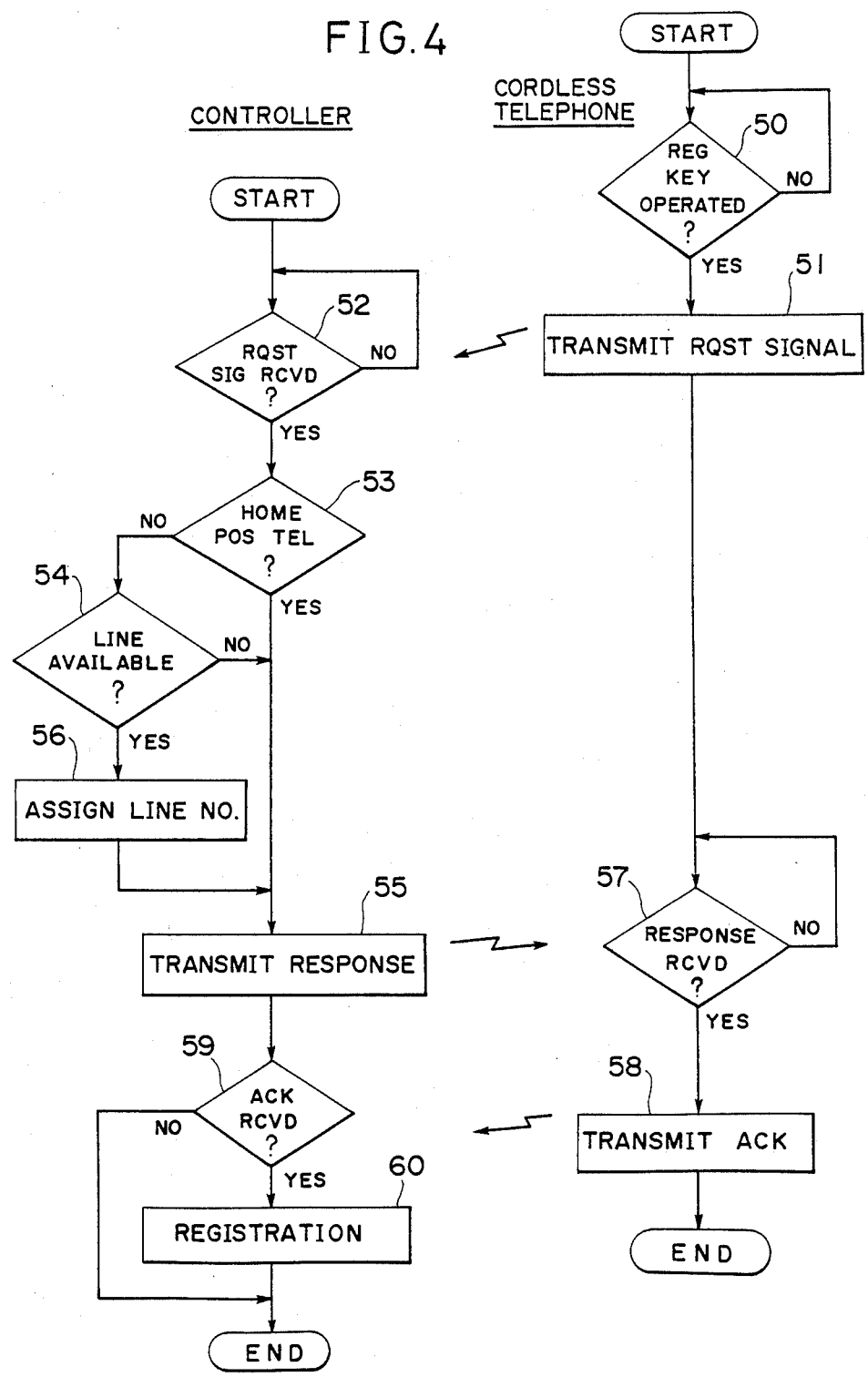

WIDE AREA CORDLESS TELEPHONE SYSTEM HAVING MEANS FOR AVOIDING DOUBLE REGISTRATIONS

BACKGROUND OF THE INVENTION

The present invention relates to a wide area cordless telephone system.

A cordless telephone system is known which comprises a stationary access unit to which a telephone line from a switching system is connected and a transportable cordless unit which establishes a two-way radio channel to the access unit as long as it stays within a specified range.

A wide area cordless telephone system has recently been proposed to provide wide area services for corporate premises as part of PBX (private branch exchange) telephones. According to the proposed scheme, the whole area of the system is divided into a plurality of local areas. A plurality of fixed access units are located in each local area. Each access unit of a given local area establishes a radio channel to any of the home position cordless telephones that belong to the given local area as well as to non-home position roaming cordless telephones that enters that local area. The home position cordless telephones have corresponding line terminals in the associated PBX or in the public switched telephone network. Each cordless telephone has a multichannel access capability to have access to any of the access units and includes a manually operated key that is operated by the user when a request is made for registration of the location of his telephone. Since the cordless telephones can access any of the access units, a pre-dialing switching stage is provided in each local area to establish a connection between each access unit and a line terminal of PBX or public switched network so that the telephones can be connected to their corresponding line terminals of the PBX or switched network before dialing procedure begins. A controller is provided to register the cordless telephones where they are located in their own local area. In order to allow cordless telephones to roam from one area to another, line terminals of the PBX or public switched network are reserved and the controller assigns a reserved line terminal to an entering non-home position telephone and communicates this fact to other local areas.

However, if a cordless telephone crossing a boundary between adjacent local areas sends a registration request to elicit a response, there is a likelihood of the request being received simultaneously by two or more access units of the adjacent areas and plural responses are returned which indicate the grant of registration in respective local areas, thus resulting in "double" registrations.

SUMMARY OF THE INVENTION

It is therefore an object of the present invention to provide a wide area cordless telephone system which avoids double registrations of a roaming cordless telephone.

To accomplish this object, the wide area cordless telephone system of the present invention covers a service area which is divided into a plurality of local areas. A plurality of home position portable, multi-channel access cordless telephones belong to each local area and have corresponding line terminals in a telephone switching system. Each cordless telephone of a given local area establishes a two-way radio link and transmits a registration request identifying that telephone through the established radio link upon entry of a manual command. On receiving a response identifying a local area, the requesting telephone returns an acknowledgement identifying the same local area as identified by the received response. A plurality of fixed access units are located in each local area to define a plurality of access zones. Radio links are established between the access unit and the home position cordless telephones as well as non-home position cordless telephones belonging to another local area. A pre-dialing switching stage is provided in each local area to set up connections between line terminals of the telephone switching system and the access units. The pre-dialing switching stage of each local area includes a controller which receives the registration request and acknowledgement to control a matrix switch. On receiving a registration request from a cordless telephone, the controller transmits a response identifying the local area of its pre-dialing stage through an access unit through which it has received the request, assigns a reserved line terminal of the telephone switching system to the requesting cordless telephone if it is identified as belonging to another local area, and on receiving an acknowledgement, makes registration of the cordless telephone if this acknowledgement identifies the same local area as identified by the transmitted response.

Since the desired access unit is usually closest to the requesting telephone and its reception sensitivity is such that the signal having the highest level has the effect of masking weaker signals, the acknowledgement it transmits contains the identification of only one local area even though there is a response of lower signal level from an undesired adjacent local area.

BRIEF DESCRIPTION OF THE DRAWINGS

The present invention will be described in further detail with reference to the accompanying drawings, in which:

FIG. 4 is a flowchart useful for a better understanding of the present invention.

DETAILED DESCRIPTION

Figure 1:
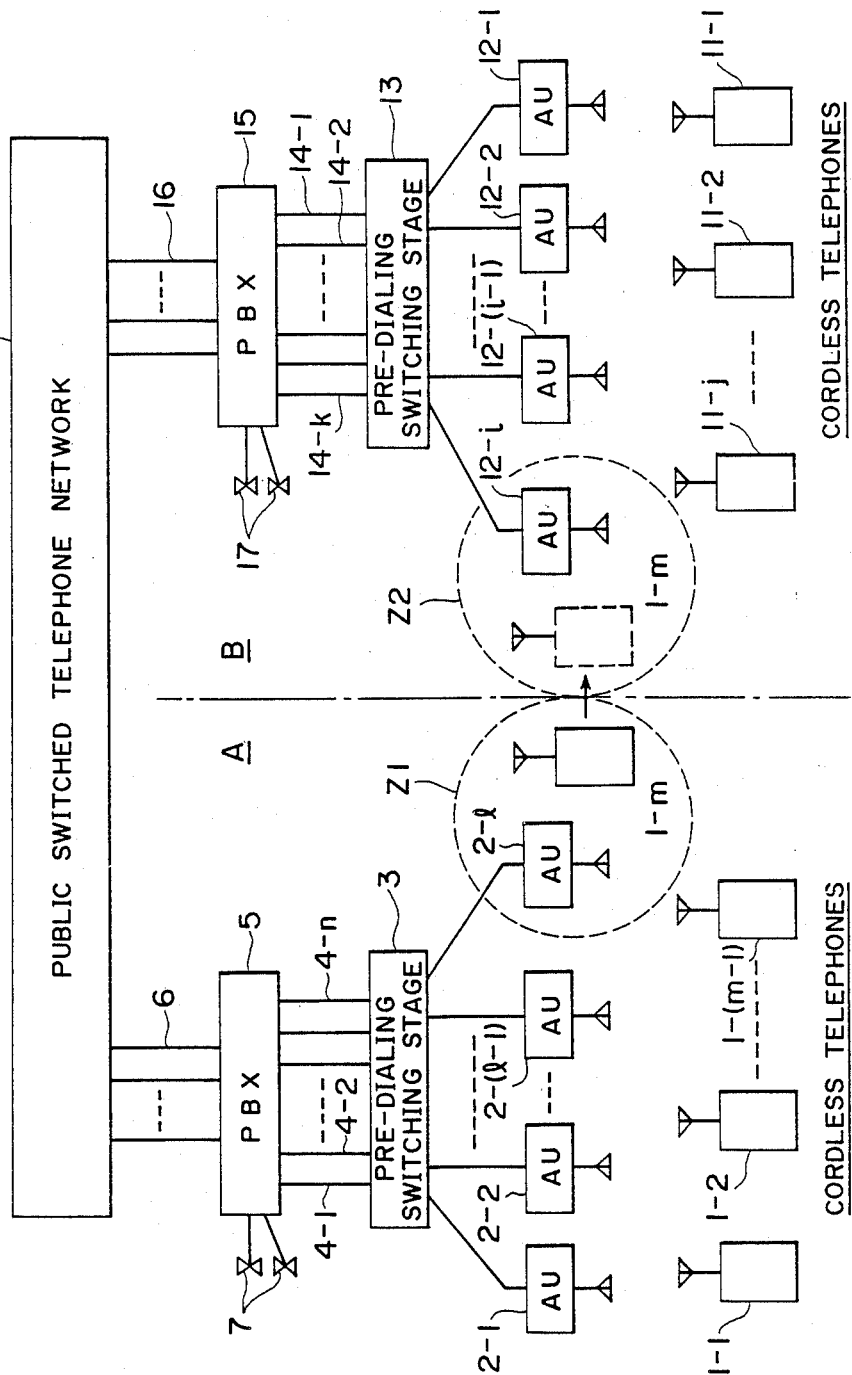
FIG. 1 is a block diagram of a wide area cordless telephone system of the present invention.

Referring now to FIG. 1, a wide area cordless telephone system of the present invention is shown. The system covers a wide area which is divided into a plurality of local service areas, only two of which are shown in FIG. 1 for simplicity. Each local area may be a premises of a corporate division and is further divided into a plurality of access zones Z as represented by a dotted circles Z1 and Z2. Local area A has, a plurality of home-position portable cordless telephones 1-1 through 1-$m$ having their corresponding PBX line terminals in a PBX (private branch exchange) 5 to which other PBX telephones 7 may be connected. PBX 5 is connected to the public switched telephone network 8 via subscriber lines 6 in a conventional manner. In each access zone there is a fixed radio access unit, or transceiver 2. Each cordless telephone 1 has a multi-channel access capability to access any of the access units 2-1 through 2-$l$ and to access any of a plurality of access units of other local areas when it is located in such areas. Each access unit 2 has a multi-channel access facility to access any of the cordless telephones located within the own access zone by establishing a two-way radio link using a control channel. Access units 2-1 through 2-*l* are connected to "l" access line terminals of a pre-dialing switching stage 3 which establishes a connection between any one of the "l" access line terminals and any one of "n" line terminals 4-1 through 4-*n* of PBX 5 before dialing begins.

In a similar manner, the local area B is divided into a plurality of access zones in each of which is located an access unit 12. A plurality of home-position portable cordless telephones 11-1 through 11-*j* belong to the local area B and have their corresponding PBX line terminals in a PBX 15 to which other PBX telephones 17 may be connected. PBX 15 is connected to the public switched telephone network 8 via subscriber lines 16. Each cordless telephone 11 has a multi-channel access capability to access any of access units 12-1 through 12-*j* and to access any of a plurality of access units of other local areas when it is located in such areas. Each access unit 12 has a multi-channel access facility as access units 2 to establish a two-way radio link with a cordless telephone 11 located in the own access zone. Access units 12-1 through 12-*j* are connected to "j" access line terminals of a pre-dialing switching stage 13 which establishes connections between the "j" access line terminals and "k" line terminals 14-1 to 14-*k* of PBX 15 before dialing takes place.

Intra-PBX connections are established between cordless telephones of the same local area via the associated PBX and inter-PBX connections are established by way of the public switched telephone network 8. It is to be noted that the pre-dialing switching stages 3 and 13 may be connected directly to subscriber line terminals of the public switched network 8.

Among the "n" PBX access lines, "m" PBX access lines are assigned permanently to the "m" cordless telephones 1 respectively and the "n-m" PBX access lines are reserved for temporary use with the non-home position telephone which roams into the local area A. Likewise, among the "k" PBX access lines, "j" PBX access lines are assigned permanently to the "j" cordless telephones 11 respectively and the "k-j" PBX access lines are reserved for temporary use with the non-home position cordless telephone roaming into the local area B.

Figure 2:
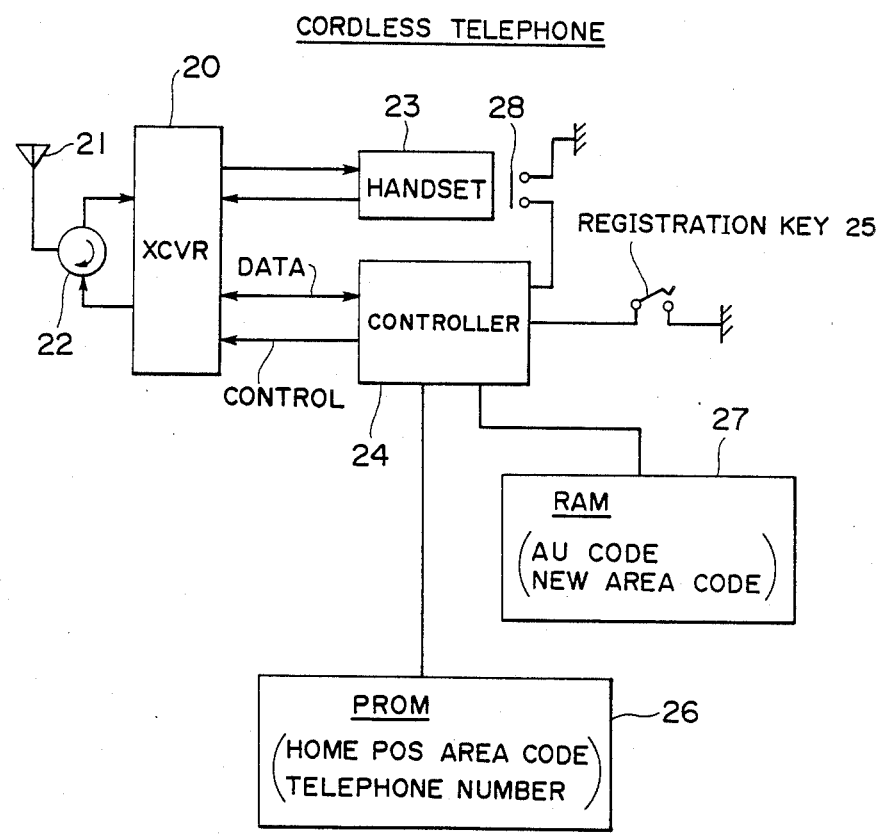
FIG. 2 is a block diagram of a cordless telephone employed in the present invention.

As shown in FIG. 2, each of the cordless telephones 1 and 11 comprises a multi-channel access transceiver 20 and antenna 21 connected to it through duplexer 22. Transceiver 20 is controlled by a controller 24 and exchanges speech signals with a handset 23 and control signals with controller 24. Any of the cordless telephones establishes a two-way frequency modulation radio channel with any of the access units 2-1 to 2-*l* and 12-1 to 12-*i*.

A manually operated registration switch 25 is connected to the controller 24. As will be described later, the operation of this switch causes the controller 24 to generate a registration request signal identifying the own telephone and transmit it to nearby access units to elicit a response that identifies the local area of such access units. On receiving such a response, the controller 24 generates an acknowledgement signal identifying the same local area as identified by the response and returns it to the nearby access units in order to allow registration to be made only in a local area in which the requesting telephone is located. A programmable read only memory 26 is connected to the controller 24. This memory stores a local area code identifying the local area in which the home position telephone is located and a telephone number identifying that telephone. The data stored in the memory 26 are recalled in response to the operation of the registration switch 25 so that they ar contained in the registration request signal. Further connected to the controller 24 is a random access memory 27 which stores an access unit identification that identifies the access unit with which the telephone has established a radio link and a new local area code identifying the local area in which the telephone is registered. A hook switch 28 is operated in response to the handset 23 going off-hook to cause the controller 24 to read data from the random access memory 27 to generate a call request signal when a call is to be originated.

Figure 3:
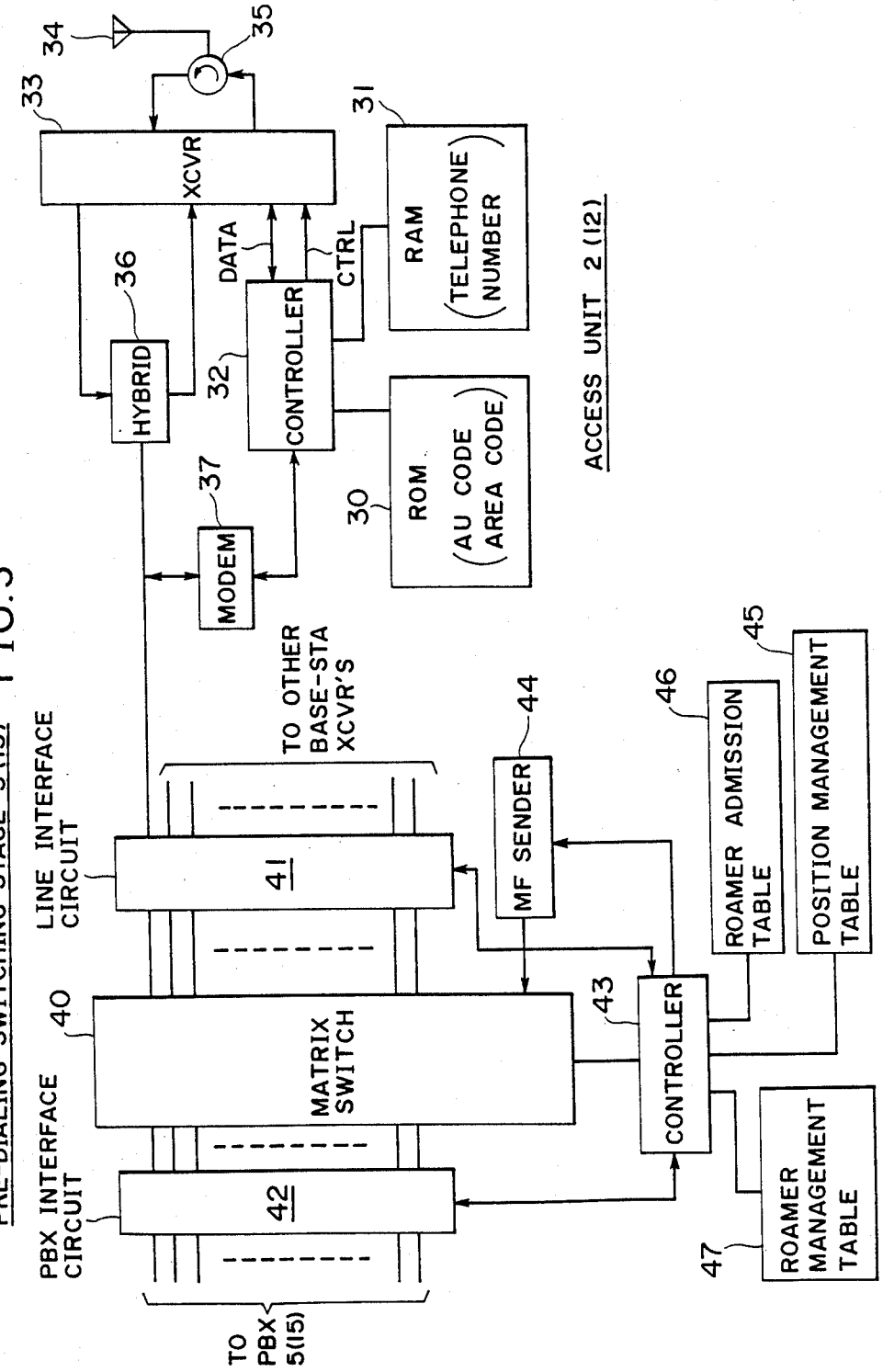
FIG. 3 is a block diagram of a pre-dialing switching stage and an access unit of FIG. 1.

In FIG. 3, each access unit 2 (12) comprises a read only memory 30 in which an access unit code identifying the own access unit and an area code identifying the own local area are stored. Data stored in the memory 30 are recalled by a controller 32 when the access unit receives a call request signal or registration request signal and the recalled data are appended to a signal to be sent to the concentrator.

The telephone number of the cordless telephone with which the own access unit has established a link is stored in a random access memory 31. This memory is recalled by the controller 32 whenever a call is originated or terminated. Controller 32 is connected by data and control lines to a transceiver 33 to which an antenna 34 is connected through a duplexer 35. Transceiver 33 establishes a two-way frequency modulation radio channel with any of the cordless telephones. A hybrid 36 is connected to the transceiver 33 to provide 2-wire 4-wire conversion between the transceiver 33 and an input terminal of the line concentrator 3 or 13. Controller 32 is also connected to the input terminal of the concentrator through a modem 37.

Each of the pre-dialing switching stages 3 and 13 comprises a matrix switch 40 having an array of line terminals connected by a line interface circuit 41 to the associated access units 2 (or 12) and an array of PBX line terminals connected by a PBX interface circuit 42 to the PBX access lines of the associated PBX. A controller 43 establishes a path in the matrix switch 40 between a PBX line terminal and a multi-frequency sender 44 in response to a call request signal which it receives through the line interface circuit 41 and passes dialed information to the sender 44 to send out a multi-frequency dialing signal to the PBX 5 (15). When the MF dialing signal has been transmitted, controller 43 disconnects the sender 44 and connects the line terminal of the calling telephone to the associated PBX line terminal. An incoming call request from the PBX is also applied to the controller 43 to establish a ringing connection through the matrix 40 to a called telephone.

A registration request signal sent from any cordless telephone is likely to be received by more than one access unit 2 (12) with varying input levels. The received signals are applied through the line interface circuit 41 to the controller 43. Controller 43 selects one of the signals having the highest input level and identifies the requesting telephone transmitting it and the access unit through which it has been received, recognizing the location of this cordless telephone. Controller 43 then transmits a response indicating that the registration request has been granted. The response signal is received by the requesting telephone, whereupon it sends out an acknowledgement signal to the access unit. When the controller 43 receives the acknowledgement signal, it creates a record in a position management table 45 indicating a relational link between a file storing the identification of the requesting telephone and a file storing the identification of that access unit.

When a non-home position telephone is entering the own local area and requesting a registration, the controller 43 identifies this telephone and an access unit through which the request is received and accesses a roamer admission table 46 to determine if the number of such non-home position telephones is not in excess of a limit which in the local area A corresponds to the n-m reserved PBX lines 4 and in the area B corresponds to the k-j commonly used PBX lines 14. If it is, the controller 43 assigns one of the reserved PBX lines to the roaming telephone and transmits a response signal, granting the registration request and indicating the assigned PBX telephone number. In response to an acknowledgement from the requesting roaming telephone, the controller 43 creates a record in a roamer management table 47 indicating a relational link between a file storing the identification of the roaming telephone, a second file storing the identification of the access unit relaying the signals and a third file storing the PBX telephone number just assigned to that telephone. Roamer management table 47 is consulted by the controller 43 every time an outgoing call is originated from the registered roaming telephone or an incoming call is terminated thereto. Controller 43 now proceeds to communicate the newly assigned PBX telephone number to the controller 43 of the other local area via the switched telephone network 8, for example, to permit incoming calls to be forwarded to the right destination.

For a better understanding of the operation of the system, reference is made to FIG. 4. When the registration key 25 of a cordless telephone is depressed (block 50), a registration request signal is transmitted (block 51) and received by a access unit (block 52). The request signal contains the identification of the telephone, which is examined by the controller 43 to determine if the requesting telephone is a home position telephone or a non-home position telephone (block 53). If the requesting telephone is a non-home position telephone, the controller checks for the presence of an idle reserved line in the commonly used PBX lines. If there is none, a response signal is returned from the controller 43 to the telephone indicating that the request is not granted (block 55), and if there is one, an idle PBX line is assigned to the telephone (block 56) and a response signal is returned indicating the line number of the assigned PBX line terminal and an area identification code identifying the local area of its pre-dialing (block 55). When the response signal is received by the requesting telephone (block 57), it sends an acknowledgement signal including the same area identification code as contained in the response of block 55 (block 58). When the acknowledgement signal is received by the controller 43 (block 59), it proceeds to register the requesting telephone in the roamer management table 47.

The advantage of the present invention can be appreciated when a telephone enters an adjacent local area. When a roaming cordless telephone 1-m, for example, (FIG. 1) is initially located within the service zone Z1 of the access unit 2-l. Assume that it entered the service zone Z2 of the access unit 12-i, crossing the boundary between local areas A and B, and the user depressed the registration key 25, a registration request signal is transmitted and received by the access unit 12-i. Since it is likely that this request signal is also received by the access unit 2-l because of its relative proximity to the telephone 1-m, the controller 43 of pre-dialing stage 3 will also return a response granting permission to the request. If there is an idle line in the PBX 15 for the telephone 1-m, the request is granted and a response containing the identification of the local area B is returned. However, since the access unit 12-i is closer to the telephone 1-m than the access unit 2-l is to it, the response signal from access unit 12-i will be received by the telephone 1-m with a higher input level than the signal it receives from access unit 2-l. Since the carrier is modulated in frequency, weaker signals are completely masked by the stronger signal. Telephone 1-m thus returns an acknowledgement signal including the identification of the local area as contained in the response received from the access unit 12-i. Controller 43 of local area B proceeds to create a record for the telephone 1-m in the roamer management table 47. Failing to receive an acknowledgement, controller 43 of local area A does not proceed to create a registration record in the position management table 45.

The foregoing description shows only one embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A wide area cordless telephone system covering a service area which is divided into a plurality of local areas, comprising:

a plurality of home position portable cordless telephone provided in each one of said local areas, each of said home position cordless telephones having a corresponding line terminal in a telephone switching system and multi-channel access means for establishing a two-way radio link, transmitting a registration request through the established link upon entry of a manual command and subsequently transmitting an acknowledgement upon receipt of a response identifying a local area, said request identifying the cordless telephone which transmitted the request;

a plurality of access units provided in said one local area for establishing said radio links with said home position cordless telephones and non-home position cordless telephones belonging to another level area; and a pre-dialing switching stage provided in said one local area for establishing a connection between said access units and line terminals of said telephone switching stage including control means connected to said access units for receiving said request and acknowledgement therethrough, transmitting a response identifying the local area of said pre-dialing switching stage through one of said access units on receiving a registration request and assigning a reserved line terminal of said telephone switching system to a non-home position cordless telephone if the same is identified by the received request, and making registration of a cordless telephone on receiving an acknowledgement identifying the same local area as identified by said transmitted response.

2. A wide area cordless telephone system as claimed in claim 1, wherein said control means communicates information concerning the assigned line terminal and an identification of said non-home position cordless telephone to the control means of another local area.

3. A wide area cordless telephone system as claimed in claim 1, wherein said telephone switching system comprises:
a public switched telephone network; and
a private branch exchange provided in one or more of said local areas, said private branch exchange being connected to said switched telephone network, wherein said control means assigns a line terminal of said private branch exchange to a non-home position cordless telephone entering the own local area of said control means.

4. A wide area cordless telephone system as claimed in claim 1, wherein said response is a frequency modulated signal.

* * * * *

UNITED STATES PATENT AND TRADEMARK OFFICE
CERTIFICATE OF CORRECTION

PATENT NO. : 4,879,740

DATED : November 7, 1989

INVENTOR(S) : Nagashima et al

It is certified that error appears in the above-identified patent and that said Letters Patent is hereby corrected as shown below:

Column 4, line 7, delete "ar" insert --are--.

Column 5, line 53, after "pre-dialing" insert --stage--.

Signed and Sealed this

Fifteenth Day of January, 1991

Attest:

HARRY F. MANBECK, JR.

Attesting Officer

Commissioner of Patents and Trademarks